UNITED STATES PATENT OFFICE.

AUGUST BLANK AND KARL HEUSNER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYE.

969,450.  Specification of Letters Patent.  Patented Sept. 6, 1910.

No Drawing.  Application filed December 17, 1909. Serial No. 533,701.

*To all whom it may concern:*

Be it known that we, AUGUST BLANK and KARL HEUSNER, doctors of philosophy, chemists, citizens of the German Empire, residing at Leverkusen, near Cologne, Germany, have invented new and useful Improvements in New Azo Dyes, of which the following is a specification.

Our invention relates to the manufacture and production of new substantive azo dyes which can be obtained by combining the tetrazo compounds from para-phenylenediamin-azo-beta-amino-alpha-naphthol-beta-sulfonic acids:

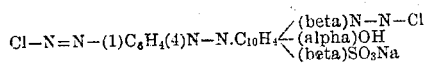

in any order of succession with one molecule of a 1.8-aminonaphthol-sulfonic acid in acid solution and with one molecule of an azo dyestuff component, especially resorcin, a meta-diamin, or a meta-aminophenol.

The new dyes are in the shape of their alkaline salts dark powders which are soluble in water generally with a blue color and which are soluble in concentrated sulfuric acid with from a greenish-blue to dark blue color. They dye cotton from blue to black shades. When on fiber they can be combined with diazo compounds. Generally black shades fast to light are thus obtained. These shades can be discharged to a pure white.

150 parts of para-aminoacetanilid are diazotized and introduced at 0° C. into a solution of 207 parts of sodium carbonate and 261 parts of sodium salt of 2-amino-5-naphthol-7-sulfonic acid. The combination is complete after a short time. In order to eliminate the acetyl group 2500 parts of caustic soda lye (30 per cent.) are added to the mixture which is heated to boiling for some time. The saponified compound is then tetrazotized in the usual way by acidulating, adding 300 parts of HCl (19.5° Bé.) and 138 parts of sodium nitrite and the resulting tetrazo compound is then at first combined in acid solution with 363 parts of the sodium salt of 1.8-aminonaphthol-4.6-disulfonic acid. After some hours the free mineral acid is neutralized with sodium acetate. The intermediate compound is then introduced into a cooled solution of 110 parts of resorcin and 1035 parts of sodium carbonate in water. The combination is complete after a short time. The new dye is salted out, filtered off and dried.

The new dye is in the shape of its sodium salt a dark powder which is soluble in water with a blue color. It dyes cotton blue shades. By treating in the usual way the dyed goods with diazotized para-nitranilin a black is obtained which is fast to light and which can be discharged to a pure white with hydrosulfites. By reduction with stannous chlorid and hydrochloric acid the dye is split up. Paraphenylenediamin, 2.6-diamino-5-naphthol-7-sulfonic acid, aminoresorcin and 1.2-diamino-8-naphthol-4.6-disulfonic acid are thus obtained.

The process for the manufacture of the dyestuffs is carried out in an analogous manner on using other of the above mentioned components *e. g.* instead of 2.5.7-aminonaphthol sulfonic acid the 2.8.6-aminonaphthol sulfonic acid can be used, instead of 1.8.4.6-aminonaphthol sulfonic acid the 1.8.4-, 1.8.5-aminonaphthol sulfonic acid or 1.8.3.6-aminonaphthol disulfonic acid, and instead of resorcin meta-aminophenol, meta-phenylene-diamin or their derivatives may be used.

We claim:—

1. The herein described azo-dyestuffs obtainable from the above defined tetrazo compounds, which dyestuffs are in the shape of their alkaline salts dark powders soluble in water generally with a blue color, soluble in concentrated sulfuric acid with from a greenish-blue to dark blue color; dyeing cotton from blue to black shades, which can be developed on fiber with diazo compounds generally black shades fast to light being obtained which can be discharged to a pure white, substantially as described.

2. The herein described azo dyestuff obtainable from para-aminoacetanilid, 2.5.7-aminonaphthol sulfonic acid, 1.8.4.6-aminonaphthol disulfonic acid and resorcin, which is in the shape of its sodium salt a dark powder soluble in water with a blue color, dyeing cotton blue shades, which can be combined with diazotized para-nitranilin black shades fast to light being obtained, which can be discharged to a pure white and yielding upon reduction with stannous chlorid and hydrochloric acid para-phenylenediamin, 2.6-diamino-5-naphthol-7-sulfonic acid, aminoresorcin and 1.2.-diamino-8-naphthol-4.6-disulfonic acid, substantially as described.

In testimony whereof we have hereunto set our hands in the presence of two subscribing witnesses.

AUGUST BLANK. [L. S.]
KARL HEUSNER. [L. S.]

Witnesses
OTTO KÖNIG,
CHAS. J. WRIGHT.